US012645802B2

(12) United States Patent
Pant et al.

(10) Patent No.: US 12,645,802 B2
(45) Date of Patent: Jun. 2, 2026

(54) SECURE AND DYNAMIC INDEPENDENT DIAGNOSTICS MODULE INJECTIONS TO SUPPORT AN INDEPENDENT DIAGNOSTICS MODULE DURING PREBOOT DIAGNOSTICS

(71) Applicant: Dell Products L.P., Round Rock, TX (US)

(72) Inventors: Neeraj Kumar Pant, Almora (IN); Jose P. Dumas, Bengaluru (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 18/765,872

(22) Filed: Jul. 8, 2024

(65) Prior Publication Data

US 2026/0010628 A1     Jan. 8, 2026

(51) Int. Cl.
*G06F 21/57* (2013.01)

(52) U.S. Cl.
CPC .......... *G06F 21/572* (2013.01); *G06F 21/577* (2013.01)

(58) Field of Classification Search
CPC ............................ G06F 21/572; G06F 21/577
USPC ............................................................. 713/2
See application file for complete search history.

(56) References Cited

U.S. PATENT DOCUMENTS

| | | | |
|---|---|---|---|
| 10,133,504 B2 * | 11/2018 | Pan ........................ | G06F 9/5061 |
| 11,068,599 B2 * | 7/2021 | Montero ................. | G06F 21/64 |
| 11,301,258 B2 * | 4/2022 | Suryanarayana ...... | G06N 20/00 |
| 11,334,436 B2 * | 5/2022 | Suryanarayana ... | G06F 11/3688 |
| 2022/0350717 A1 * | 11/2022 | Vidyadhara ........... | G06F 9/4401 |
| 2023/0267044 A1 * | 8/2023 | Vidyadhara ........... | G06F 9/4403 |
| | | | 714/36 |
| 2025/0245018 A1 * | 7/2025 | Suryanarayana ..... | G06F 9/4408 |

* cited by examiner

*Primary Examiner* — Brian T Misiura
(74) *Attorney, Agent, or Firm* — Terrile, Cannatti & Chambers, LLP; Stephen A. Terrile

(57) ABSTRACT

A firmware management operation. The firmware management operation includes providing an information handling system with a distributed BIOS; identifying information handling system diagnostics data, the information handling system diagnostics data being associated with an independent diagnostics module; authenticating the independent diagnostics module; and, executing the independent diagnostics module on the information handling system via a diagnostics event manager.

17 Claims, 10 Drawing Sheets

SECURE AND DYNAMIC INDEPENDENT DIAGNOSTICS MODULE INJECTIONS TO SUPPORT AN INDEPENDENT DIAGNOSTICS MODULE DURING PREBOOT DIAGNOSTICS

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed BIOS; identifying information handling system diagnostics data, the information handling system diagnostics data being associated with an independent diagnostics module; authenticating the independent diagnostics module; and, executing the independent diagnostics module on the information handling system via a diagnostics event manager.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS; identifying information handling system diagnostics data, the information handling system diagnostics data being associated with an independent diagnostics module; authenticating the independent diagnostics module; and, executing the independent diagnostics module on the information handling system via a diagnostics event manager.

In another embodiment the invention relates to a computer-readable storage medium embodying computer program code, the computer program code comprising computer executable instructions configured for: providing an information handling system with a distributed BIOS; identifying information handling system diagnostics data, the information handling system diagnostics data being associated with an independent diagnostics module; authenticating the independent diagnostics module; and, executing the independent diagnostics module on the information handling system via a diagnostics event manager.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
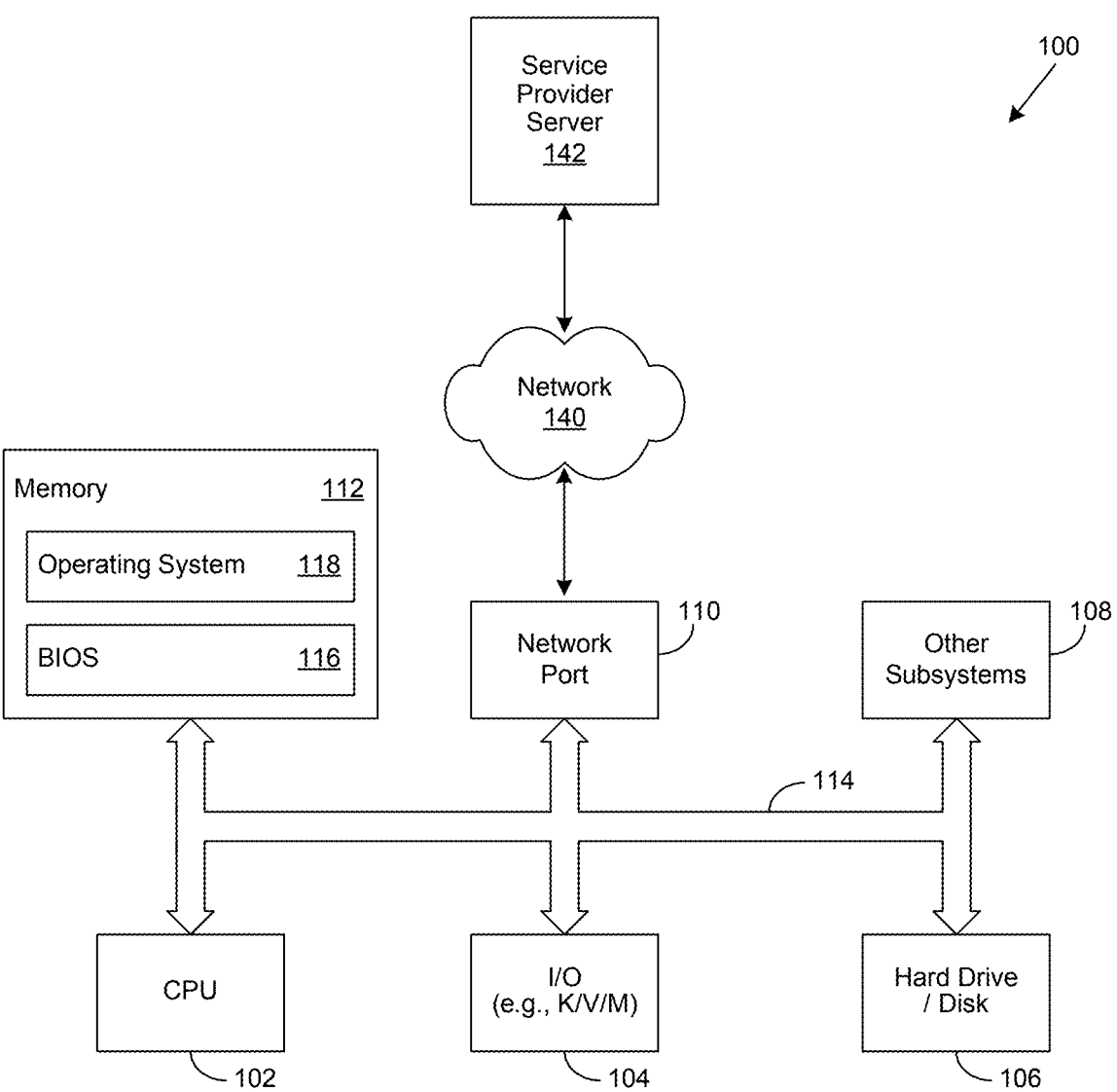
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention likewise reflect an appreciation that it is not uncommon for firmware modules associated with certain components of an IHS, such as cameras, audio modules, fingerprint readers, and so forth, to be provided by their respective manufacturer to an IHS original equipment manufacturer (OEM). Likewise, various aspects of the invention reflect an appreciation that the Unified Extensible Firmware Interface (UEFI) specification supports dynamic loading of EFI modules. However, various aspects of the invention likewise reflect an appreciation that the inability to resolve certain hardware, firmware, and operating system (OS) interdependencies may impede establishing an environment capable of dynamically linking and loading a particular diagnostics module to support a particular IHS.

Furthermore, various aspects of the invention reflect an appreciation that there is currently no known approach for creating an environment that can dynamically support a diagnostics module configured for a particular IHS. Likewise, independent diagnostic modules (IDMs) are currently only able to be statically bound offline. Accordingly, it would be advantageous to enable an IDM to load and link dynamically. However, various aspects of the invention reflect an appreciation that accomplishing this goal would involve the use of a dynamic IDM boot path resolution protocol with runtime capability resolver intelligence.

Various aspects of the invention reflect an appreciation that due to limited space available in Serial Peripheral Interface (SPI) flash memory, storing all relevant IDMs, including those that are third party vendor-dependent, and their correct version, may require more SPI storage space than may be available. Likewise, IDMs are prone to have frequent updates, which could result in reduction of SPI memory life. Accordingly, the ability to dynamically load an IDM, based upon an IHS's health status, hardware capabilities, vendor and library dependencies, and so forth, would be advantageous, as running an old or non-relevant version of a particular IDM could result in damage to hardware, or be ineffectual when performing associated diagnostics.

Likewise, various aspects of the invention reflect an appreciation that there is currently no known approach for dynamically authorizing and loading IDMs at the boot path, especially for non-OEM IDMs. Furthermore, statically binding its security not only increases the size of the IDM, but also increases complexity in maintaining it with respect to versioning changes versus different vendor signing and security methods. Also, it is restrictive for IDM vendors to bind for a single security method across different generations.

Various aspects of the invention reflect an appreciation that space used in SPI flash memory could be reduced by dynamically loading only those IDMs that are needed to support a particular IHS, or an associated component thereof. Likewise, since frequent firmware updates may result in reducing the lifetime of SPI memory, loading only those IDMs that are needed, as they are needed, may extend SPI memory lifecycles. Various aspects of the invention likewise reflect an appreciation that such an approach may provide an environment for dynamically loading and authorizing non-OEM IDMs, as opposed to using limited SPI memory to store a copy of every IDM that may possibly be used.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In various embodiments, the firmware management operation may be implemented to include the performance of an independent diagnostic module (IDM) management operation. An IDM management operation, as used herein, broadly refers to any function, task, procedure, or process performed, directly or indirectly, within a multi-processor operating environment, or an architecture-specific distributed firmware management platform (ASDFMP), which are described in greater detail herein, to locate, securely and dynamically load, and authenticate, or a combination thereof, one or more IDMs for subsequent use by a particular IHS 100, regardless of where they may be stored.

Skilled practitioners of the art will be familiar with an IDM, which as used herein broadly refers to a software component, or a system, designed to monitor and diagnose certain operational aspects of an IHS 100, or one or more components thereof. In various embodiments, such an IDM may be implemented to detect and troubleshoot particular issues associated with an IHS 100, or an associated multi-processor operating environment, to identify potential problems, provide insights to improve performance or increase reliability, and suggest possible remediation approaches, or a combination thereof. In certain embodiments, the firmware management operation may be performed during operation of an IHS 100. In various embodiments, performance of the firmware management operation may result in the realization of improved operation of an IHS 100.

Figure 2:
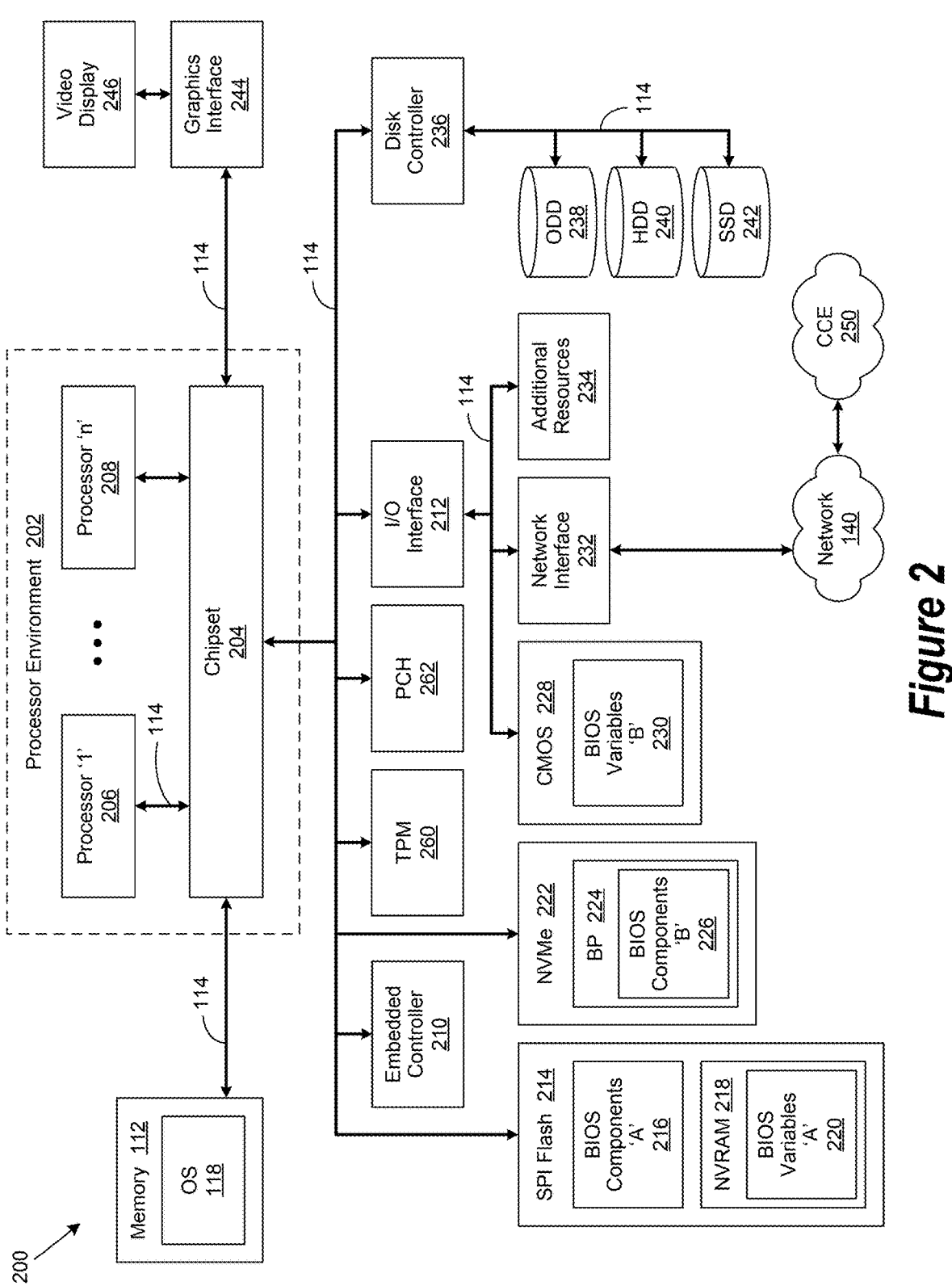
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208. In various embodiments, the one or more architectures can include an x86 type processor architecture, an ARM type processor architecture, or a combination thereof. In various embodiments, a processor environment implementing an x86 type processor architecture provides an x86 type processor environment. In various embodiments, a processor environment implementing an ARM type processor architecture provides an ARM type processor environment.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1'

206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, a Trusted Platform Module (TPM) 260, a Platform Controller Hub (PCH) 262, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the TPM 260, the PCH 262, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
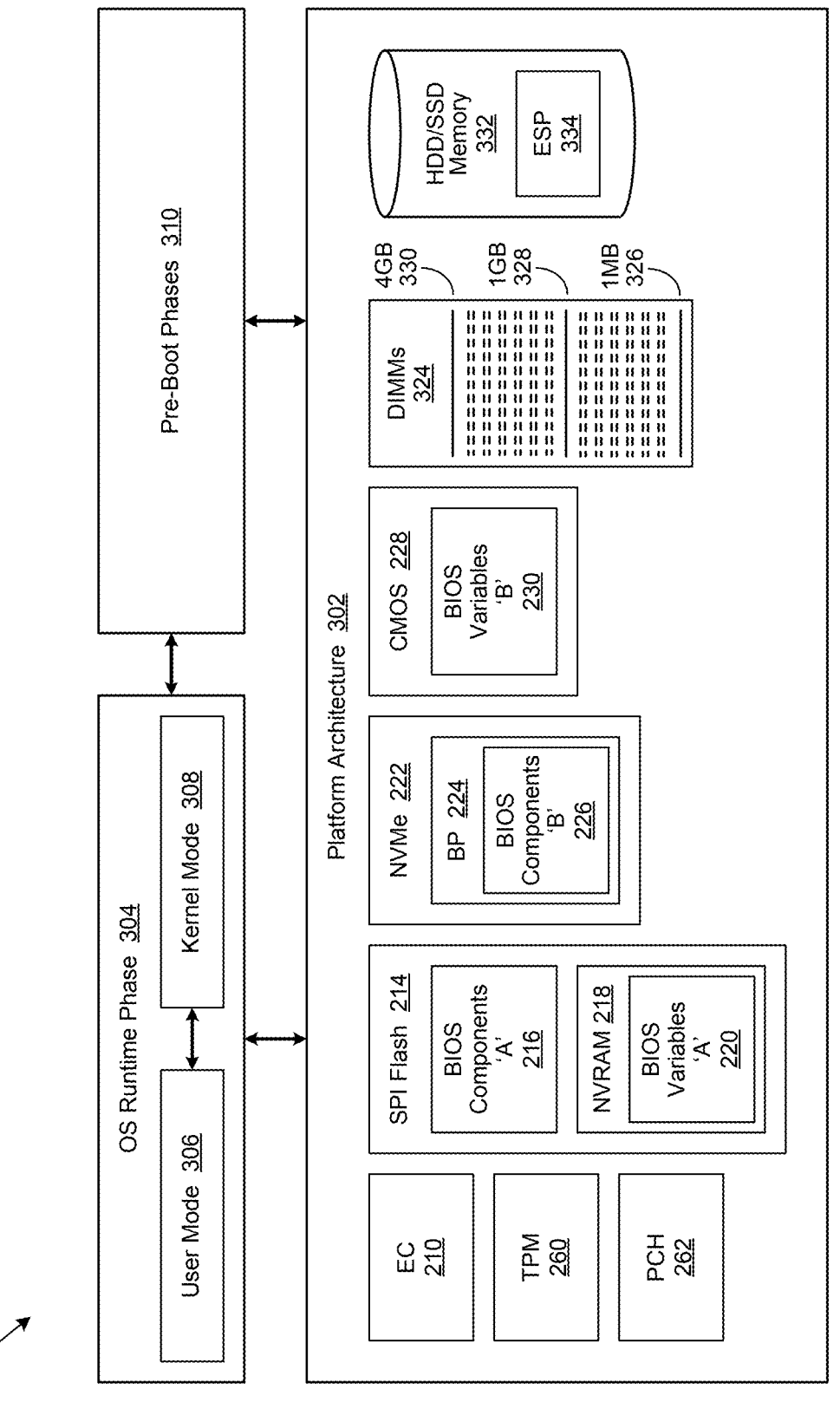
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, a Trusted Platform Module (TPM) 260, a Platform Controller Hub (PCH) 262, Serial Peripheral Interface (SPI) Flash 214 memory, Nonvolatile Memory Express (NVMe) 222 memory, and a complementary metal-oxide-semiconductor (CMOS) 228 chip, or a combination thereof, as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the EC 210 may be implemented, directly or indirectly, within the ASDFMP 300 to provide a root of trust function. As used herein, a root of trust broadly refers to a highly reliable component, such as an EC 210, that performs specific, important security functions. In various embodiments, a root of trust component may be implemented as a building block upon which other components of the ASDFMP 300 can derive security functions.

In various embodiments, the EC 210 may be implemented to perform a root of trust operation. As used herein, a root of trust operation broadly refers to a distributed firmware management operation, described in greater detail herein, performed directly, or indirectly, within an ASFDMP 300 to provide a root of trust by leveraging a secure interface to ensure integrity and security of communication between certain components of the ASDFMP 300. In various embodiments, one or more root of trust operations may be performed to enhance the security and trustworthiness of the ASDFMP 300.

Skilled practitioners of the art will be familiar with a TPM 260, which is an international standard for a secure crypto processor, typically implemented as a dedicated microcontroller designed to secure various hardware components of an ASDFMP 300 through the use of integrated cryptographic keys. In various embodiments, a TPM 260 may be implemented to increase the security of an ASDFMP 300 and to protect it against certain firmware attacks. In various embodiments, a TPM 260 may be implemented in combination with an EC 210 to perform a root of trust operation.

Those of skill in the art will likewise be familiar with a PCH 262, which broadly refers to a family of chipsets manufactured by Intel® to control certain data paths and support functions used in conjunction with Intel® processors. However, as used herein, a PCH 262 may broadly refer to one or more processor-agnostic functionalities of an ASDFMP 300 that may be used, directly or indirectly within it, to control various data paths and support functions associated with a particular processor. Examples of such processors include those manufactured by Intel®, AMD®, Qualcomm®, Broadcom®, Nvidia®, and so forth. Accordingly, various embodiments of the invention reflect an appreciation that provision of such PCH 262 functionalities may require a different implementation for each processor architecture.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
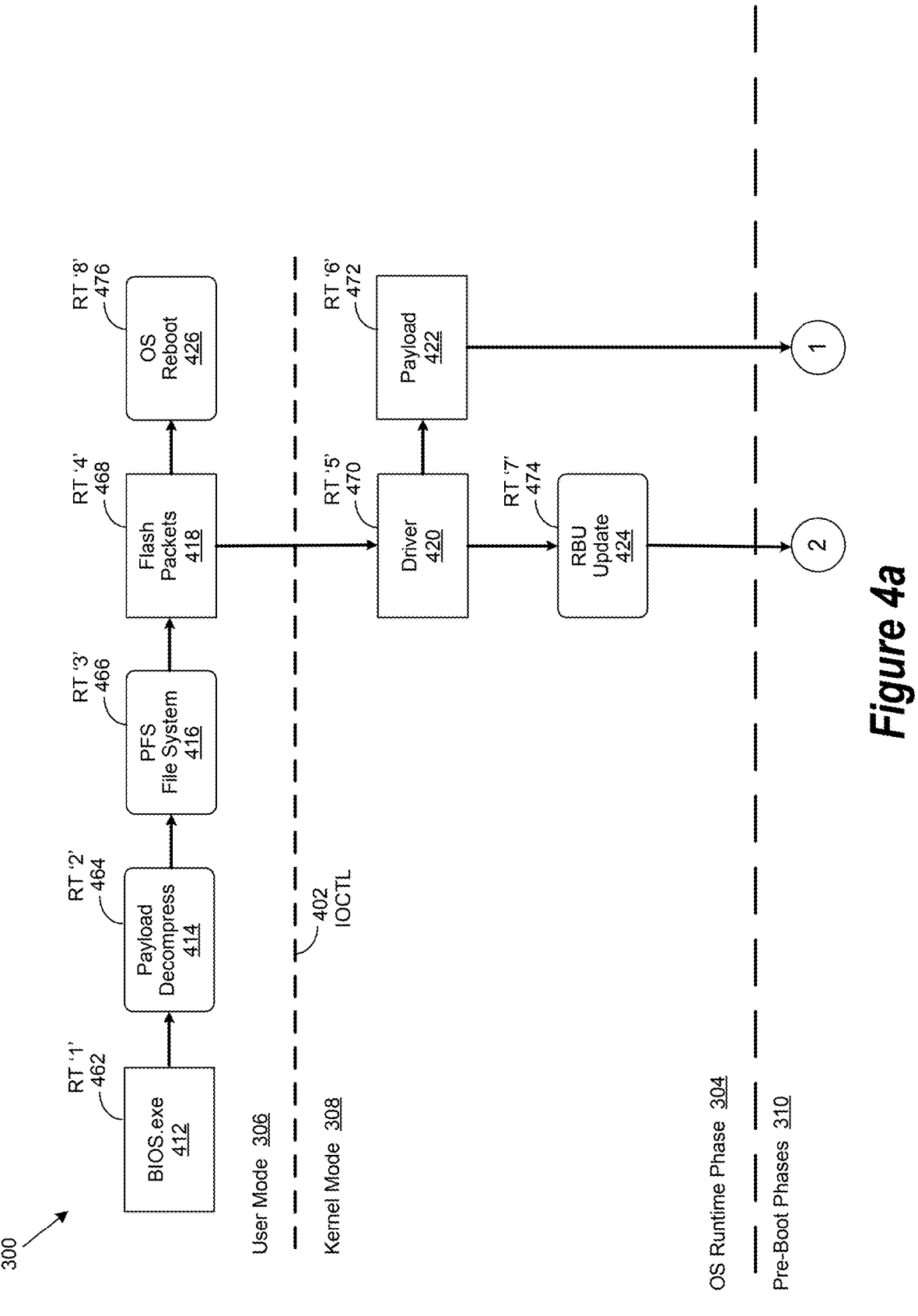
FIGS. 4a through 4c are a simplified block diagram showing the performance of certain distributed firmware management operations.
Figure 4B:
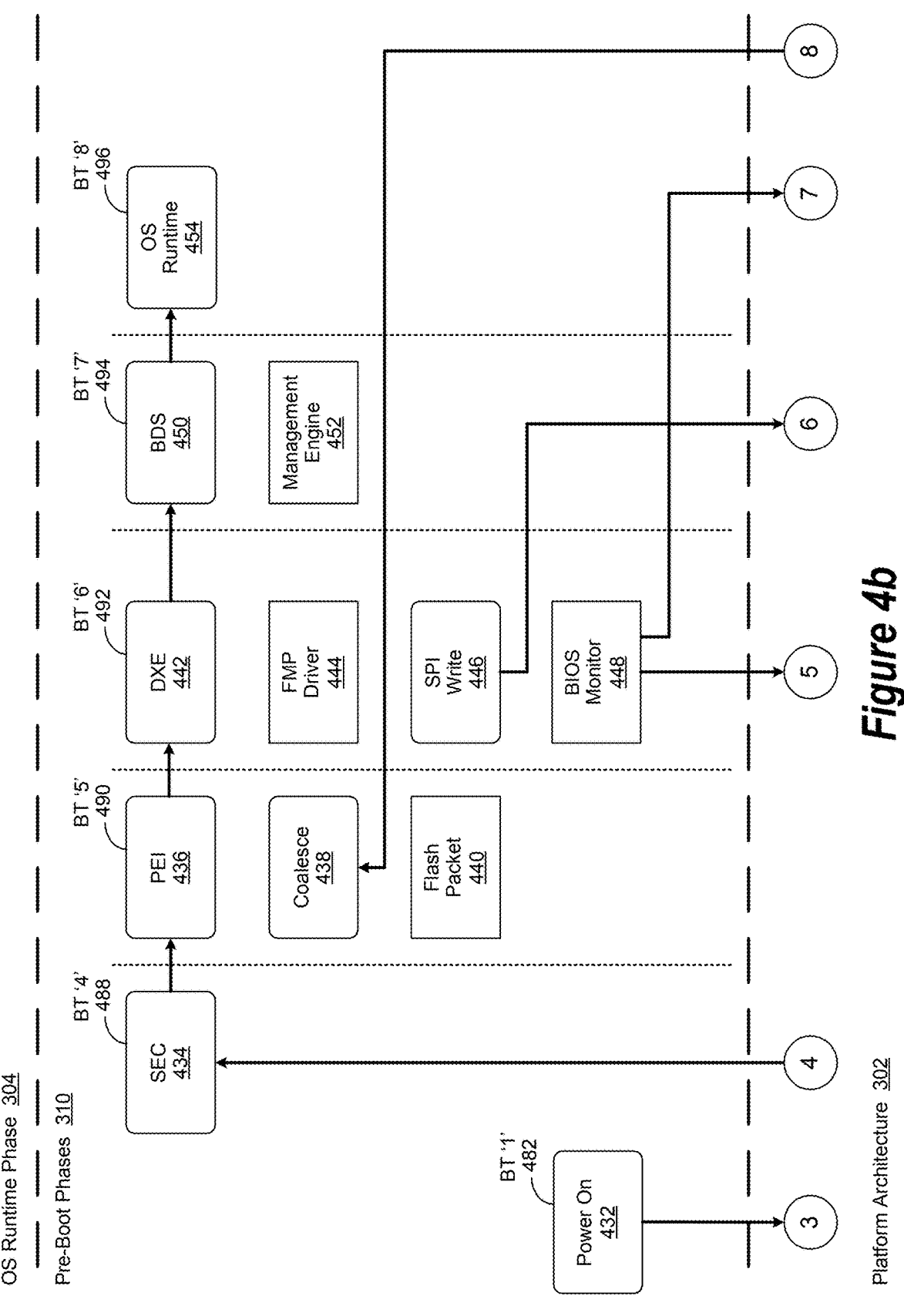
Figure 4C:
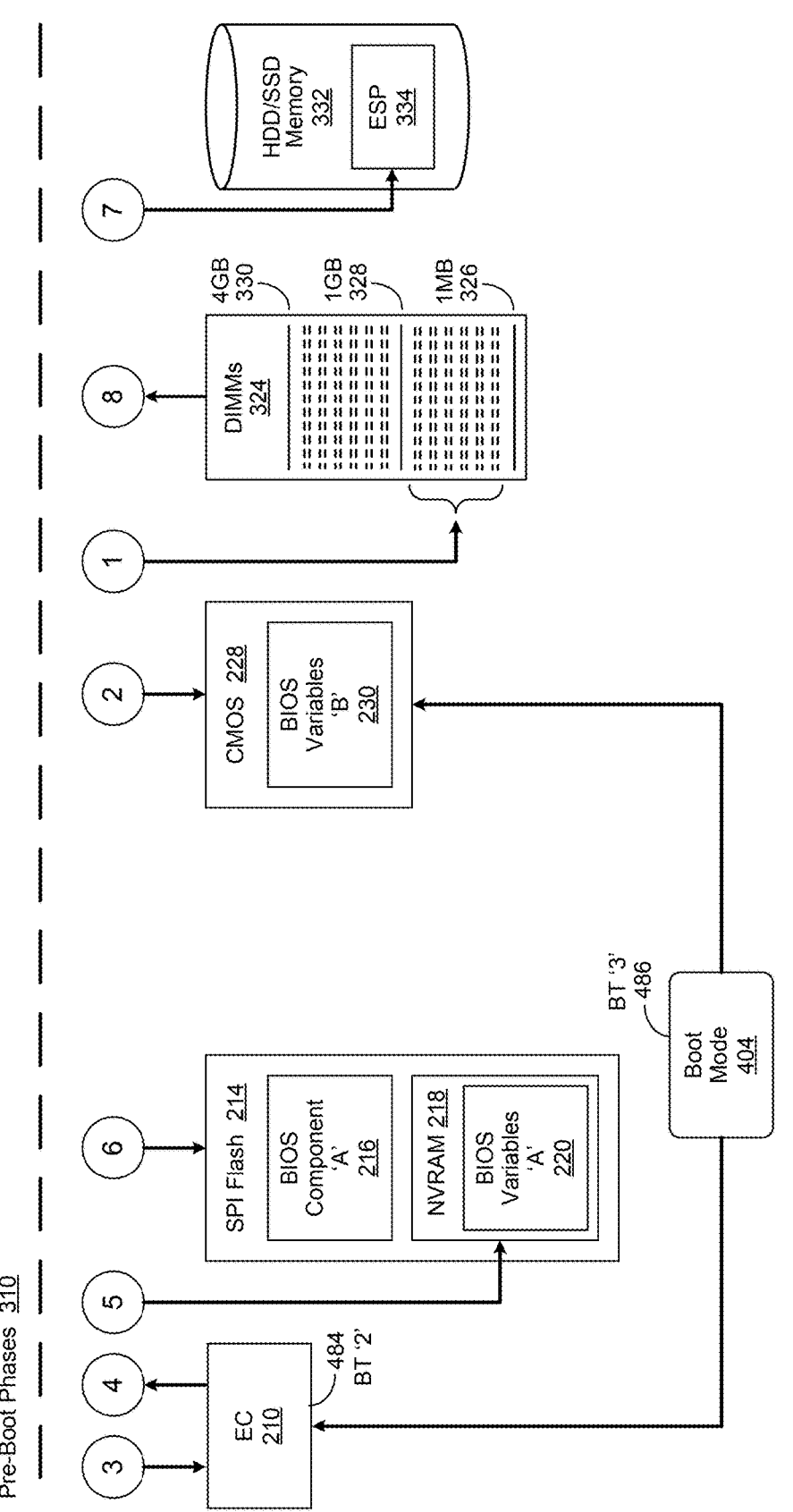

FIGS. 4a through 4c are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4a, a distributed firmware management operation may be initiated by the ASDFMP 300 receiving a BIOS.exe 412 file in runtime (RT) step '1' 462. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one or more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver execution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) drivers 444. In general, the DXE Core component is responsible for producing a set of boot services, DXE services, and RT Services. Likewise, the DXE Dispatcher component is responsible for discovering and executing FMP drivers 444 in the correct order. In turn, the FMP drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
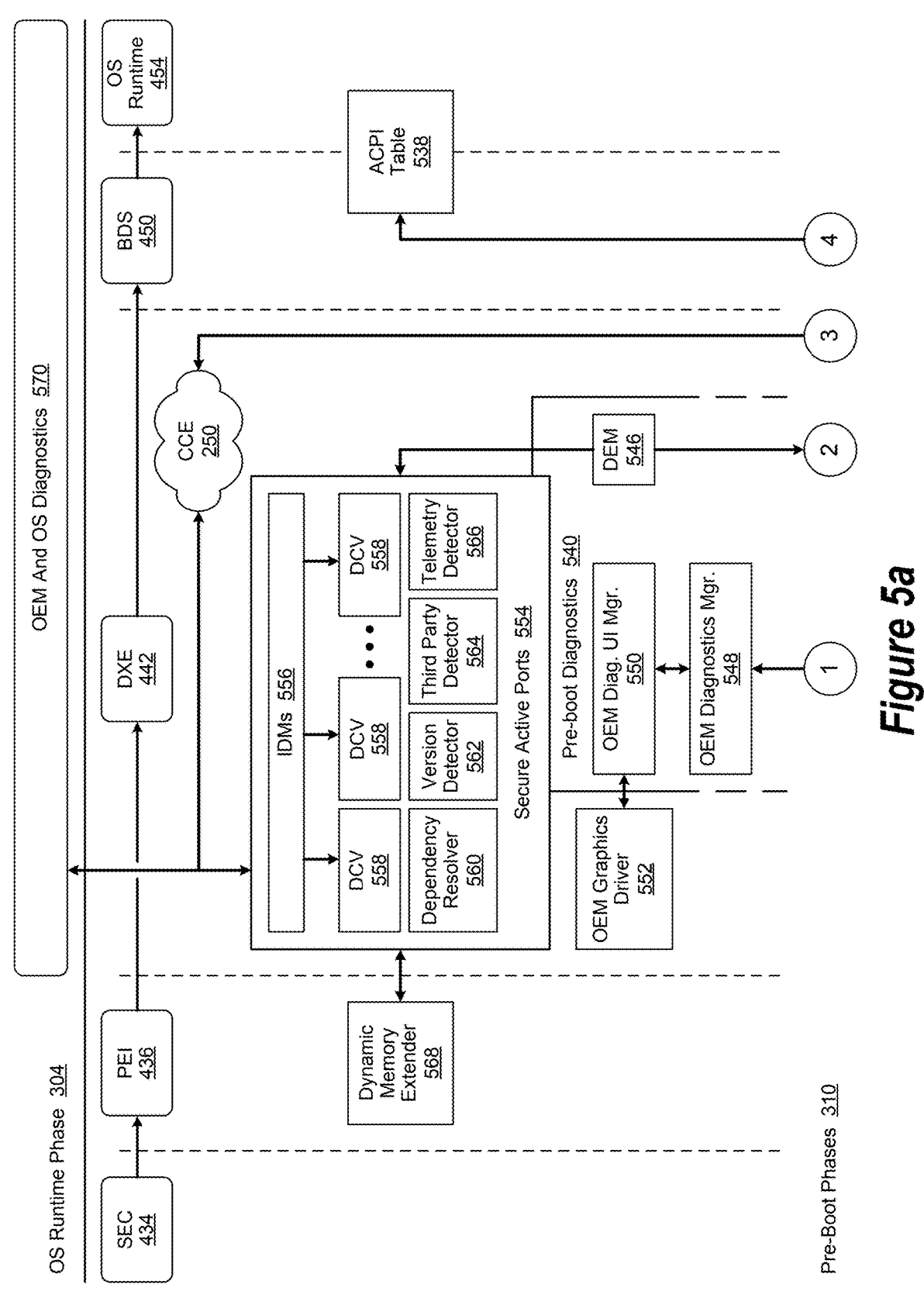
FIGS. 5a and 5b are a simplified block diagram of a dynamic pluggable independent diagnostic module (IDM) system.
Figure 5B:
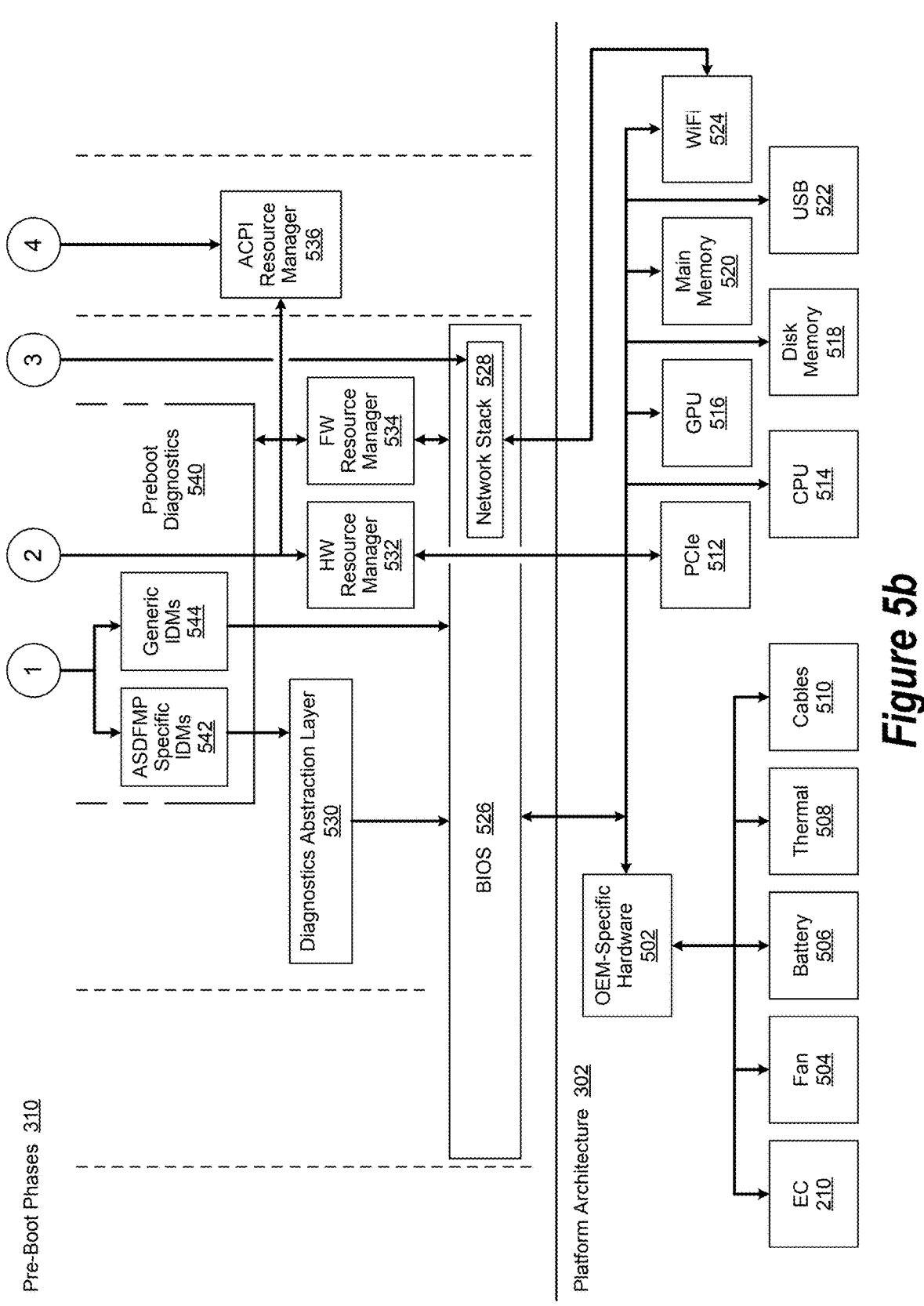

FIGS. 5a and 5b are a simplified block diagram of a dynamic pluggable independent diagnostic module (IDM) system implemented in accordance with an embodiment of the invention. In various embodiments, the dynamic pluggable IDM system shown in FIGS. 5a and 5b may be implemented within an architecture-specific distributed firmware management platform (ASDFMP), described in greater detail herein. As described in greater detail herein, the ASDFMP may be implemented in certain embodiments to include an Operating System (OS) runtime phase 304, various pre-boot phases 310, and a platform architecture 302. In various embodiments, the pre-boot phases 310 may include a security (SEC) 434 phase, a Pre Extensible Firmware Interface (EFI) Initialization (PEI) 436 phase, a Driver execution Environment (DXE) 442 phase, a boot device selection (BDS) 450 phase, and an OS runtime phase 454, all of which will be familiar to skilled practitioners of the art.

In various embodiments, the platform architecture may be implemented to include certain original equipment manufacturer (OEM) 502, and third party, hardware. In various embodiments, examples of such OEM 502 hardware may include an embedded controller (EC) 210, a fan control 504 module, a battery control 506 module, a thermal control 508 module, one or more cables 510, and so forth. Likewise, examples of third-party software in various embodiments may include a Peripheral Component Interconnect Express (PCIe) bus controller 512 module, a central processing unit (CPU) 514, a graphics processing unit (GPU) 516, one or more disk memory devices 518, main memory 520, a Universal Serial Bus (USB) controller 522, a Wireless Fidelity (WiFi) controller 524, and so forth.

In various embodiments, the OEM 502 and third-party hardware may be implemented to interact with a Basic Input/Output System (BIOS) 526 implemented within the ASDFMP. In various embodiments, the BIOS 526 may be implemented to include one or more network communication protocols, commonly referred to as a "network stack" 528. In various embodiments, the OEM 502 and third-party hardware may be implemented to be managed by one or more hardware resource managers 532. In various embodiments, the network stack 528 may be implemented to support network communications for the WiFi controller 524. In various embodiments, the network stack 528 may likewise be implemented to support network communications with a cloud computing environment (CCE) 250, described in greater detail herein.

In various embodiments, the dynamic pluggable IDM system may be implemented to include one or more secure active ports 554. In various embodiments, the one or more secure active ports 554 may be implemented to support one or more IDMs 556, and one or more diagnostic content validation (DCV) modules 558, or a combination thereof. In various embodiments, the dynamic pluggable IDM system may be implemented to include a dependency resolver 560 module, a version detector 562 module, an OEM and third-party IDM detector 564 module, and a telemetry detector 566 module, or a combination thereof. In various embodiments, the dynamic pluggable IDM system may be implemented to include a dynamic memory extender 568.

In various embodiments, the dynamic pluggable IDM system may be implemented to include a pre-boot diagnostics system 540. In various embodiments, the pre-boot diagnostics system 540 may be implemented to interact with the one or more IDMs 556, and one or more diagnostic content validation (DCV) modules 558 through one or more secure active ports 554. In various embodiments, the pre-boot diagnostics system 540 may likewise be implemented to interact with the dependency resolver 560 module, the version detector 562 module, the OEM and third-party IDM detector 564 module, and the telemetry detector 566 module, or a combination thereof, through one or more secure active ports 554.

In various embodiments, the pre-boot diagnostics system 540 may be implemented to include one or more ASDFMP-specific IDMs 542, one or more generic IDMs 544, an OEM diagnostics manager 548 module, an OEM diagnostics user interface (UI) manager 550 module, and a diagnostics event manager (DEM) 546 module. In various embodiments, the OEM diagnostics UI manager 550 module may be implemented to interoperate with an OEM graphics driver 552, familiar to those of skill in the art. In various embodiments, the OEM diagnostics manager 548 may be implemented to interact with the one or more ASDFMP-specific IDMs 542, and the one or more generic IDMs 544, or a combination thereof.

In various embodiments, the DEM 546 module may be implemented to interact with the one or more IDMs 556, and one or more diagnostic content validation (DCV) modules 558, or a combination thereof, through one or more secure active ports 554. In various embodiments, the DEM 546 module may likewise be implemented to interact with the dependency resolver 560 module, the version detector 562 module, the OEM and third-party IDM detector 564 module, and the telemetry detector 566 module, or a combination thereof, through one or more secure active ports 554. In various embodiments, the DEM 546 module may be implemented to interact with the HW resource manager 532 module, a firmware (FW) resource manager 532 module, and an Advanced Configuration and Power Interface (ACPI) resource manager 536 module.

In various embodiments, the FW resource manager 534 may be implemented to interact with the BIOS 526. In various embodiments, the one or more ASDFMP-specific IDMs 542 may be implemented to interact with a diagnostics abstraction layer 530, which in turn may be implemented in certain embodiments to interact with the BIOS 526. In various embodiments, the one or more generic IDMs 544 may be implemented to interact with the BIOS 526. In various embodiments, the ACPI resource manager 536 module may be implemented to interact with an ACPI table 538.

In various embodiments, an OEM and OS diagnostics 570 module may be implemented in the OS runtime phase 304 of the ASDFMP. In various embodiments, the OEM and OS diagnostics 570 module may be implemented to interact with the one or more IDMs 556, and one or more diagnostic content validation (DCV) modules 558, or a combination thereof, through one or more secure active ports 554. In various embodiments, the DEM 546 module may likewise be implemented to interact with the dependency resolver 560 module, the version detector 562 module, the OEM and third-party IDM detector 564 module, and the telemetry detector 566 module, or a combination thereof, through one or more secure active ports 554. In various embodiments, the OEM and OS diagnostics 570 module may be implemented to interact with the CCE 250.

In various embodiments, the dynamic pluggable IDM system may be implemented to support the performance of one or more IDM operations, likewise described in greater detail herein. In various embodiments, the dynamic pluggable IDM system may be implemented enable dynamic plug-in, and plug-out, of one or more OEM IDMs 556, or one or more third party IDMs 556, or a combination thereof. In various embodiments, a runtime environment may be implemented to enable a particular IDM 556 to run independently through the use of a diagnostics event manager (DEM) 546. In various embodiments, one of more secure active ports (SAPs) 554 may be implemented to accept only authenticated IDMs 556 through the use of one or more diagnostic content validation (DCV) modules 558.

In various embodiments, the dynamic pluggable IDM system may be implemented to enable dynamic linking, loading, and unloading of a particular IDM 556 into, and out of, a particular secure active port 554. In various embodiments, such secure active ports 554 may be pluggable and include support for the dependency resolver 560 module, the version detector 562 module, then OEM and third-party IDM detector 564 module, and the telemetry detector 566 module, or a combination thereof. In various embodiments, the one or more DCV 556 modules may be implemented to only accept trusted IDMs 556 when a new IDM 556 gets plugged into a particular secure active port 554.

In various embodiments, a particular IDM 556 may be implemented to represent its runtime requirements, in terms of dependencies, to a particular secure active port 554. In various embodiments, the dependency resolver 560 module may be implemented to interface with the DEM 546 module such that appropriate events are generated for the HW 532 and FW 534 resource managers. In various embodiments, dependency requirements associated with a particular IDM 556 may be fulfilled during run time. For example, if an IDM 556 has a requirement to test a touch screen, then an associated DEM 546 module will generate an event to the HW resource manager 532 for appropriate hardware lines reservation.

Figure 6:
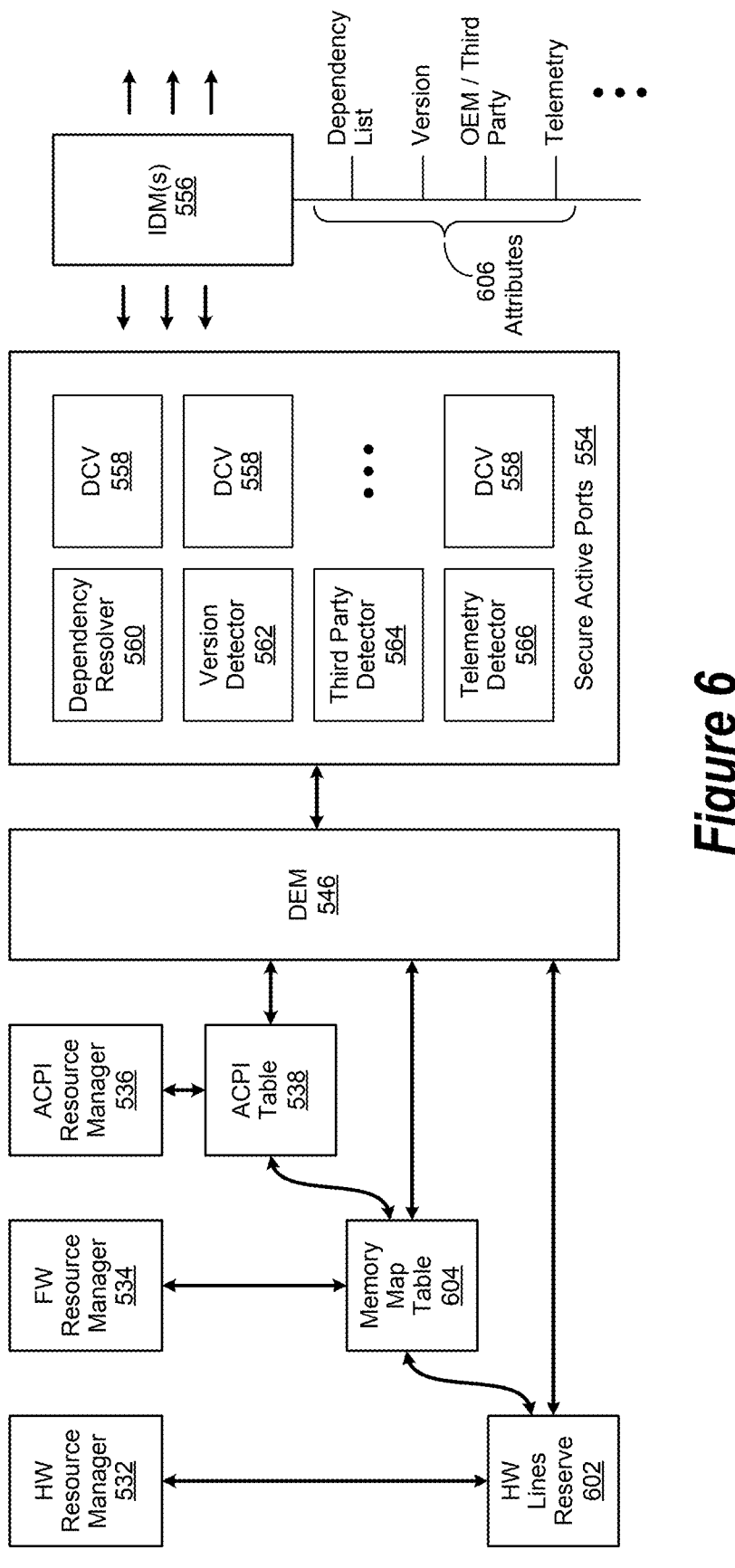
FIG. 6 is a simplified block diagram showing the performance of certain IDM management operations to resolve one or more dependencies associated with a particular IDM.

FIG. 6 is a simplified block diagram showing the performance of certain independent diagnostic module (IDM) management operations implemented in accordance with an embodiment of the invention to resolve one or more dependencies associated with a particular IDM. In various embodiments, one or more IDM management operations may be performed to resolve certain hardware and software requirements to execute a particular IDM 556 such that it can run seamlessly. In various embodiments, when an IDM 556 is unloaded, a dependency resolver 560 module may be implemented to interface with a diagnostic event manager (DEM) 546 module to generate events for releasing all resources that were previously reserved for it. In various embodiments, a DEM 546 module may be implemented to generate events for associated hardware, firmware, and advanced configuration and power interface (ACPI) pools to retrieve corresponding objects and interfaces, place them in memory, and organize them to complete the stack. In various embodiments, active interfaces may be implemented such that new IDMs 556 may be dynamically plugged in and out.

In various embodiments, a hardware (HW) resource manager 532 module may be implemented to reserve 602 one or more hardware lines. In various embodiments, the HW resource manager may be implemented to provide certain information associated with the reservation of the HW lines to the DEM 546 module. In various embodiments, the HW resource manager 532 module may be implemented to provide certain information associated with the reservation of the HW lines to a memory map table 604.

In various embodiments, a firmware (FW) resource manager 534 module may be implemented manage the memory map table 604. In various embodiments, the FW resource manager 534 module may be implemented to provide certain information stored in the memory map table 604 to the DEM 546 module. In various embodiments, the FW resource manager 534 module may be implemented to provide certain information stored in the memory map table 604 to an an ACPI resource manager 536 module. In various embodiments, the ACPI resource manager 536 module may be implemented to store memory map table 604 information it may receive from the FW resource manager 534 module in an ACPI table. In various embodiments, the ACPI resource manager 536 module may be implemented to provide certain information stored in the ACPI table 538 to the DEM 546 module.

In various embodiments, the DEM 546 module may be implemented to interact with the one or more IDMs 556, and one or more diagnostic content validation (DCV) modules 558, or a combination thereof, through one or more secure active ports 554. In various embodiments, the DEM 546 module may likewise be implemented to interact with the dependency resolver 560 module, the version detector 562 module, the OEM and third-party IDM detector 564 module, and the telemetry detector 566 module, or a combination thereof, through one or more secure active ports 554. In various embodiments, the one or more IDMs 556 may be implemented to interact with the one or more DCV modules 558 through one or more secure active ports 554. In various embodiments, the one or more IDMs 556 may be implemented to interact with the dependency resolver 560 module, the version detector 562 module, the OEM and third-party IDM detector 564 module, and the telemetry detector 566 module, or a combination thereof, through one or more secure active ports 554. In various embodiments, the one or more IDMs 556 may be implemented to have certain associated attributes 606, such as a list of associated dependencies, version information, whether it is an OEM or third-party IDM, certain telemetry information, and so forth.

Figure 7:
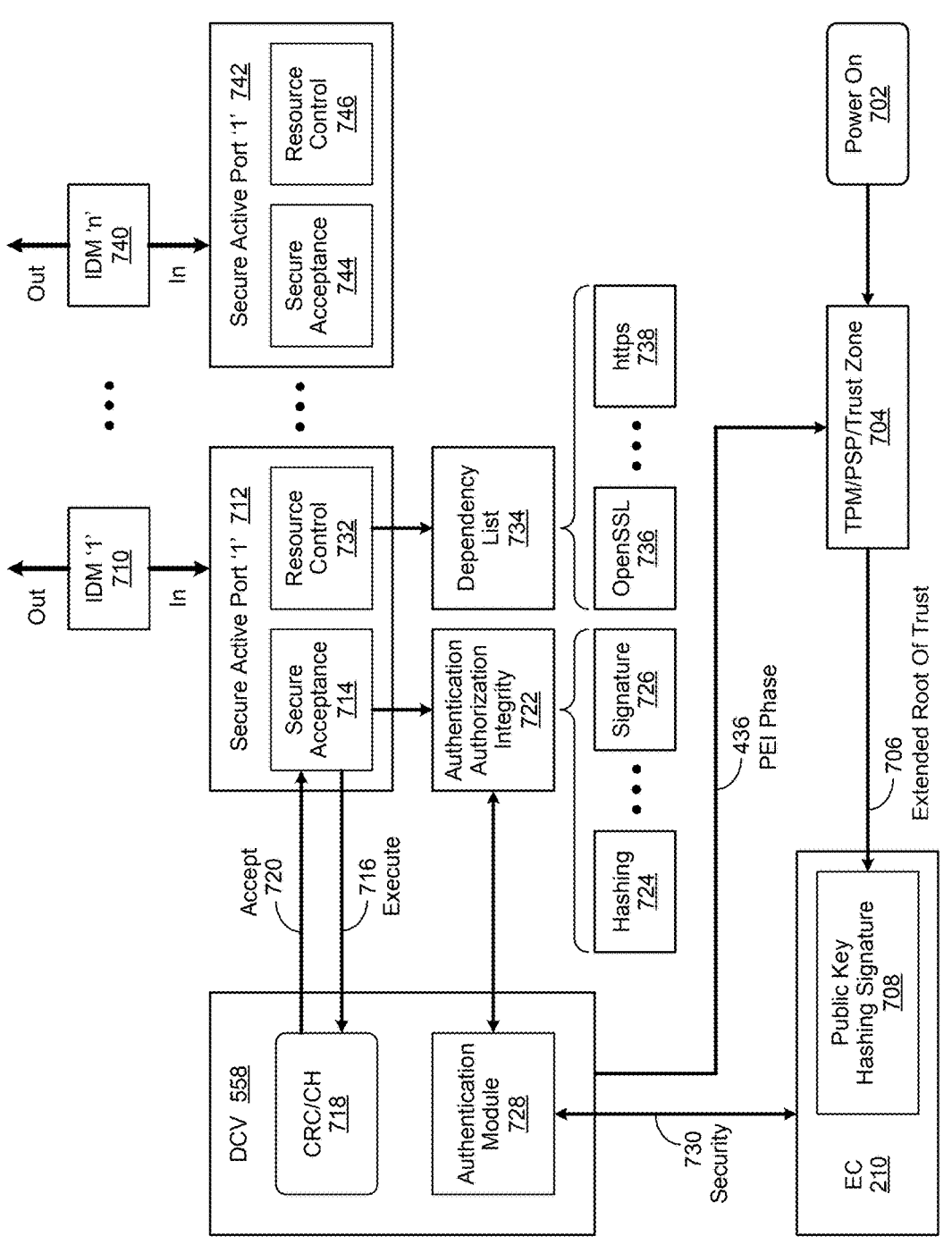
FIG. 7 is a simplified block diagram showing the performance of certain IDM management operations to securely retrieve and implement a particular IDM.

FIG. 7 is a simplified block diagram showing the performance of certain independent diagnostic module (IDM) management operations implemented in accordance with an embodiment of the invention to securely retrieve and implement a particular IDM. In various embodiments, it may not be possible to store new IDMs '1' 710 through 'n' 740, or a different version of same IDM '1' 710 through 'n' 740, in system peripheral interface (SPI) memory due to limited available storage space. Accordingly, one or more IDMs '1' 710 through 'n' 740 may be stored in secondary storage, such as a hard drive or Nonvolatile Memory Express (NVMe) memory, or downloaded from cloud storage, as described in greater detail herein.

In various embodiments, one or more diagnostic content verification (DCV) 558 modules may be implemented to ensure any non-authenticated IDM '1' 710 through 'n' 740 is rejected by an associated secure active port '1' 712 through 'n' 742. In various embodiments, the one or more secure active ports '1' 712 through 'n' 742 may be implemented to act as a form of firewall, which allows only authenticated IDMs '1' 710 through 'n' 740 to get plugged in once they have passed certain security checks. In various embodiments, a DCV 558 module may be implemented to accept a particular IDM '1' 710 through 'n' 740 only when associated measurement, authentication, and integrity checks are passed. In various embodiments, the DCV 558 may be implemented to use an embedded controller (EC) 210 to authenticate any new IDM '1' 710 through 'n' 740 by using private key and hashing algorithms familiar to those of skill in the art.

In various embodiments, each of the one or more secure active ports '1' 712 through 'n' 742 may be respectively implemented to include a Cyclical Redundancy Check (CRC)/cryptographic hash (CH) 718 module and an authentication 728 module. In various embodiments, each of the secure active ports '1' 712 through 'n' 742 may be implemented to include a secure acceptance 714 module and a resource control 732 module. In various embodiments, the secure acceptance 714 module may be implemented to interact with the CRC/CH module to execute 716 one or more associated CRC or CH functions to determine whether a particular IDM '1' 710 through 'n' 740 should be accepted 720.

In various embodiments, the secure acceptance 714 module may be implemented to interact with an authentication authorization integrity 722 module. In various embodiments, the authentication authorization integrity 722 module may be implemented to perform certain cryptographic functions, such as hashing 724, digital signature verification 726, and so forth. In various embodiments, the dependency list 734 may be implemented to maintain a list of dependencies associated with a particular IDM '1' 710 through 'n' 740, such as Open Secure Sockets Layer (Open SSL), Secure Hypertext Transfer Protocol (https), and so forth.

In various embodiments, the EC may be implemented to include a public key hashing signature 708 module. In various embodiments, a Trusted Platform Module (TPM), or a Platform Security Processor (PSP), of an associated trust zone 704 may be activated when power 702 is applied to an associated information handling system (IHS). In various embodiments, the TPM, or the PSP, or an associated trust zone 704 may be implemented to interact with the EC 210 and its associated public key hashing signature 708 module to establish an extended root of trust, described in greater detail herein. In various embodiments, the authentication 728 module may be implemented to interact with the EC 210 to establish security during the Pre Extensible Firmware Interface (EFI) Initialization (PEI) 434 pre-boot phase. In various embodiments, the DCV 558 may be implemented to interact with the TPM, or the PSP, or an associated trust zone 704 during the PEI 434 pre-boot phase.

Various embodiments of the invention reflect an appreciation that its use may result in certain cost savings for embedded controllers 210, as they have limited storage and IDMs '1' 710 through 'n' 740 can be stored in less expensive storage, such as a hard drive, or NVME storage, or provided as a cloud-based service. As an example, current pre-boot diagnostics systems may be configured to store, and use, as many as twenty different IDMs, each of which may consume as much as 150 KB, or more. Furthermore, additional, or newer versions of existing, IDMs '1' 710 through 'n' 740 are added, even more memory may be consumed. Likewise, various embodiments of the invention reflect an appreciation since only trusted IDMs '1' 710 through 'n' 740 will be dynamically loaded, and all non-trusted IDMs '1' 710 through 'n' 740 will be rejected by secure active ports '1' 712 through 'n' 742, which facilitates improvements in management of available resources.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:
   providing an information handling system with a distributed BIOS, the distributed BIOS including a BIOS component and a BIOS variable, the BIOS component and the BIOS variable being stored within different storage locations of the information handling system;
   identifying information handling system diagnostics data, the information handling system diagnostics data being associated with an independent diagnostics module;
   authenticating the independent diagnostics module; and,
   executing the independent diagnostics module on the information handling system via a diagnostics event manager; and wherein
   the independent diagnostics module communicates with a diagnostic content validation module via a secure active port.

2. The method of claim 1, wherein:
   the diagnostics event manager executes within a Driver execution Environment (DXE) pre-boot phase.

3. The method of claim 1, wherein:
   the information handling system includes an embedded controller, the embedded controller being implemented to provide a root of trust.

4. The method of claim 3, wherein:
   the root of trust is used when authenticating the independent diagnostics module.

5. The method of claim 1, wherein:
   the secure active port includes at least one of a dependency resolver module, a version resolver module, an OEM and third party IDM detector module, and a telemetry detector module.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      providing an information handling system with a distributed BIOS, the distributed BIOS including a BIOS component and a BIOS variable, the BIOS component and the BIOS variable being stored within different storage locations of the information handling system;
      identifying information handling system diagnostics data, the information handling system diagnostics data being associated with an independent diagnostics module;
      authenticating the independent diagnostics module; and,
      executing the independent diagnostics module on the information handling system via a diagnostics event manager; and wherein the independent diagnostics module communicates with a diagnostic content validation module via a secure active port.

7. The system of claim 6, wherein:

the diagnostics event manager executes within a Driver execution Environment (DXE) pre-boot phase.

8. The system of claim 6, wherein:

the information handling system includes an embedded controller, the embedded controller being implemented to provide a root of trust.

9. The system of claim 8, wherein:

the root of trust is used when authenticating the independent diagnostics module.

10. The system of claim 6, wherein:

the secure active port includes at least one of a dependency resolver module, a version resolver module, an OEM and third party IDM detector module, and a telemetry detector module.

11. A non-transitory, computer-readable storage medium embodying computer program code, the computer program code comprising computer executable instructions configured for:

providing an information handling system with a distributed BIOS, the distributed BIOS including a BIOS component and a BIOS variable, the BIOS component and the BIOS variable being stored within different storage locations of the information handling system;

identifying information handling system diagnostics data, the information handling system diagnostics data being associated with an independent diagnostics module;

authenticating the independent diagnostics module; and, executing the independent diagnostics module on the information handling system via a diagnostics event manager; and wherein the independent diagnostics module communicates with a diagnostic content validation module via a secure active port.

12. The non-transitory, computer-readable storage medium of claim 11, wherein:

the diagnostics event manager executes within a Driver execution Environment (DXE) pre-boot phase.

13. The non-transitory, computer-readable storage medium of claim 11, wherein:

the information handling system includes an embedded controller, the embedded controller being implemented to provide a root of trust.

14. The non-transitory, computer-readable storage medium of claim 13, wherein:

the root of trust is used when authenticating the independent diagnostics module.

15. The non-transitory, computer-readable storage medium of claim 11, wherein:

the secure active port includes at least one of a dependency resolver module, a version resolver module, an OEM and third party IDM detector module, and a telemetry detector module.

16. The non-transitory, computer-readable storage medium of claim 11, wherein:

the computer executable instructions are deployable to a client system from a server system at a remote location.

17. The non-transitory, computer-readable storage medium of claim 11, wherein:

the computer executable instructions are provided by a service provider to a user on an on-demand basis.

* * * * *